United States Patent

Callanen

[15] 3,645,011
[45] Feb. 29, 1972

[54] MOTION SYSTEM WITH THREE RECIPROCATING ACTUATORS FOR FLIGHT SIMULATION

[72] Inventor: Oliver E. Callanen, Falls Church, Va.
[73] Assignee: Melpar Inc., Falls Church, Va.
[22] Filed: Feb. 17, 1969
[21] Appl. No.: 799,687

[52] U.S. Cl. ........................................... 35/12 P
[51] Int. Cl. .......................................... G09b 9/08
[58] Field of Search .................................. 35/12

[56] References Cited

UNITED STATES PATENTS

| | | | |
|---|---|---|---|
| 2,787,842 | 4/1957 | Smith et al. | 35/12 |
| 3,281,962 | 11/1966 | Pancoe | 35/12 |
| 3,451,146 | 6/1969 | Pancoe et al. | 35/12 |
| 3,295,224 | 1/1967 | Cappel | 35/12 |
| 3,304,628 | 2/1967 | Kaplan | 35/12 |

Primary Examiner—Robert W. Michell
Assistant Examiner—L. Oremland
Attorney—Hurvitz, Rose & Greene

[57] ABSTRACT

A motion system for general purpose flight simulation includes three spaced-apart hydraulic actuators for imparting translation to respectively associated reciprocable pistons or rams. One of the actuators is positioned vertically in a plane containing the longitudinal or roll axis of a grounded flight trainer and the other two actuators are equally spaced from the roll axis at vertical positions on either side of the trainer in a plane containing its transverse axis. The reciprocable rams are so pivotally connected to and support the trainer at the forward end and respective sides so to enable the trainer to undergo independent rotation about its pitch and roll axis, such that vertical translation of the forward ram produces rotation of the trainer about its pitch axis, and that unequal vertical translations of both of the other rams produces rotation of the trainer about its roll axis.

31 Claims, 3 Drawing Figures

MOTION SYSTEM WITH THREE RECIPROCATING ACTUATORS FOR FLIGHT SIMULATION

BACKGROUND OF THE INVENTION

The present invention relates generally to flight simulators; that is, grounded training devices, sometimes referred to simply as "trainers," arranged and adapted to imitate the behavior of an aircraft during actual flight conditions. More particularly, my invention resides in improvements in an electrohydraulic motion system for such flight simulators.

Motion systems for flight simulation are characterized by a cockpit, a plurality of actuators for imparting various magnitudes and directions of movement to the cockpit, and an interface frame for supporting the cockpit and for transferring the forces produced by the actuators to the cockpit. In prior art motion systems, the force-imparting mechanisms have varied in structure and arrangement. In some, guides or gibs have been used to provide controlled movement of sliding members located fore-and-aft of the cockpit, in conjunction with hydraulic actuators. Problems with this approach have been encountered in uneven loading on bearings of support members and/or driving members; in interference of bearing supports and braces with visual systems simulating cloud formations, terrain, takeoff and approach obstacles, and/or targets to be viewed by the student or trainee pilot; and in unrealistic simulation of roll and pitch of the craft as a result of uneven, jerky motion transmitted through the sliding members. In other motion systems, hinged or knee joint members have been used with the actuators in arrangements leading to high bearing loading and structural loading at pivot points during acceleration of those members. Trunnion-mounted devices including single ram or piston units have been employed in still other motion systems, with the pivot points located beneath the cockpit, but this has resulted in some instability where the cockpit and/or interface frame are massive or where the center of gravity of the mass for which the actuation arrangement has been devised is changed by addition of unbalanced loads. In still further systems of which applicant is aware, gimbal-mounted devices are provided by which pivoting of the craft is along the true centerline for roll but is along an axis offset from the true centerline for pitch, and which require an auxiliary frame to produce the axial movement. For these reasons, the latter systems are plagued by an unrealistic pitch function acceleration relative to the pivot point, and by the additional inertia created by the auxiliary frame.

It is a principal object of the present invention to provide a motion system for general purpose flight simulation to provide simple, yet positive, support of the simulated training craft and to provide therein a pivoting arrangement for the craft by which to produce realistic simulation of pitch and roll.

It is another object of the invention to provide a motion system consistent with the preceding object and in which minimum loading is placed on bearing surfaces regardless of attitude of the simulated craft, and in which the overall system is stabilized by virtue of the support afforded a cockpit interface frame and of the damping supplied by auxiliary members of the support system.

SUMMARY OF THE INVENTION

According to the present invention, a motion system for general purpose flight simulation is provided in which roll and pitch angular attitude, and heave, are controllably supplied to a relatively light movable cockpit via an interface frame by controlled actuation of one or a combination of three vertical force translating ram units, which also provide support for the cockpit and frame assembly. Pivotal attachment points are provided atop the force-translating units and/or at points of support of the cockpit-frame assembly by those units, to accommodate independent variation of pitch and roll despite the changes in geometry of the system occurring with variation of either pitch or roll.

The rams are tubular members constructed and arranged to translate vertically in either direction in fixed bearings, in response to hydraulic actuation of pistons by actuators having common axes with the respective rams and supported by a base frame to drive against or away from the ram head depending upon whether pressure is increased or reduced in the actuator. Two of the three ram assemblies are positioned at either side of the simulated cockpit and are mounted in stationary larger diameter bearing housings which are themselves affixed to base-supported braces. The third ram assembly is positioned at the forward end or nose of the cockpit and is also arranged for translation in a larger diameter bearing housing which, however, is affixed to supporting brackets pivoted at the base to permit restricted longitudinal motion of the cockpit.

Cross-mounted auxiliary actuators associated with respective ones of the ram assemblies prevent undesirable resonant motion by virtue of their damping effect, or may be utilized to impart limited longitudinal or lateral motion to the cockpit for particular vibration or reaction simulations.

BRIEF DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which.

DESCRIPTION OF THE PREFERRED EMBODIMENT

Figure 1:
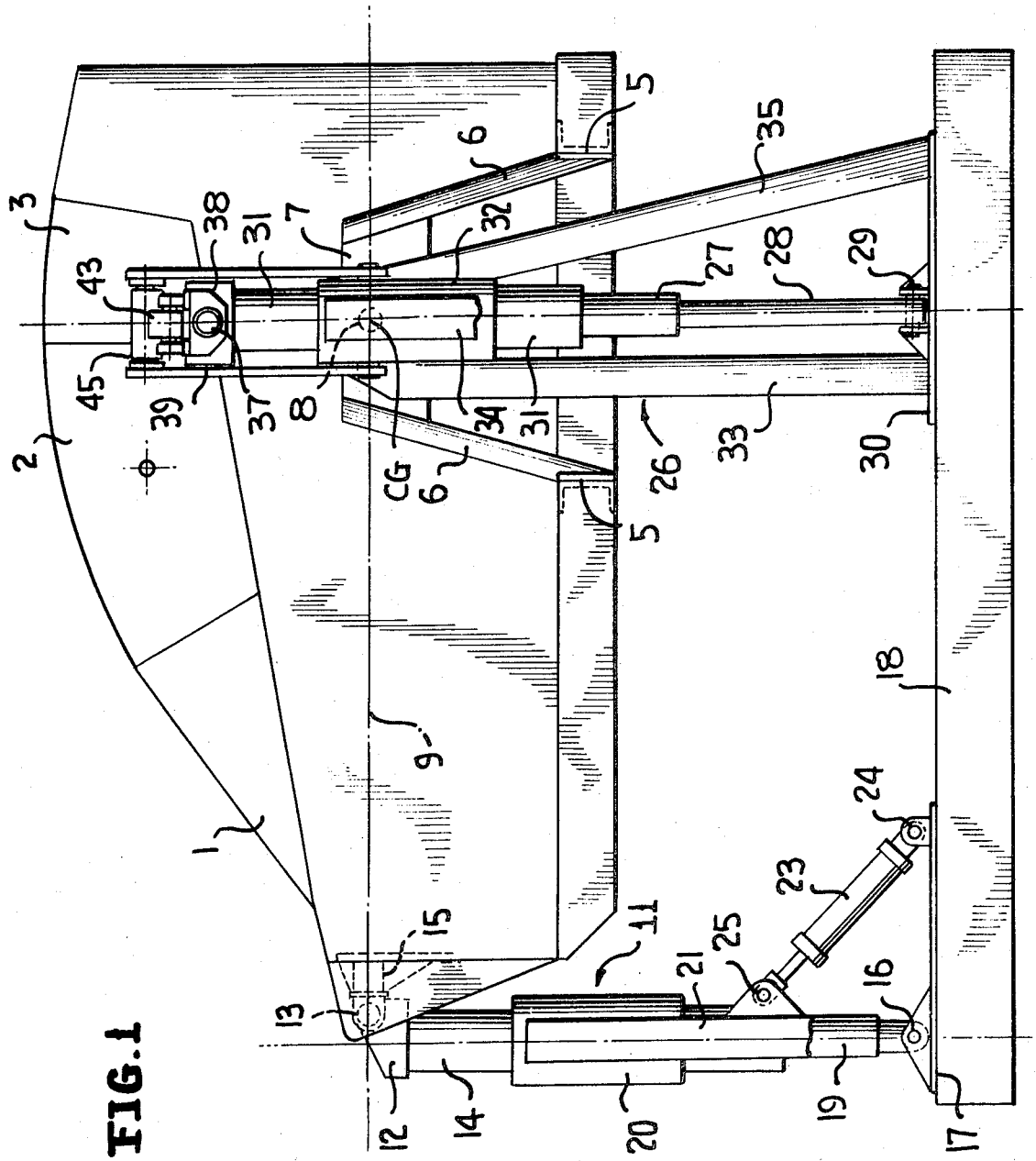
FIG. 1 is a side view of the overall system.
Figure 2:
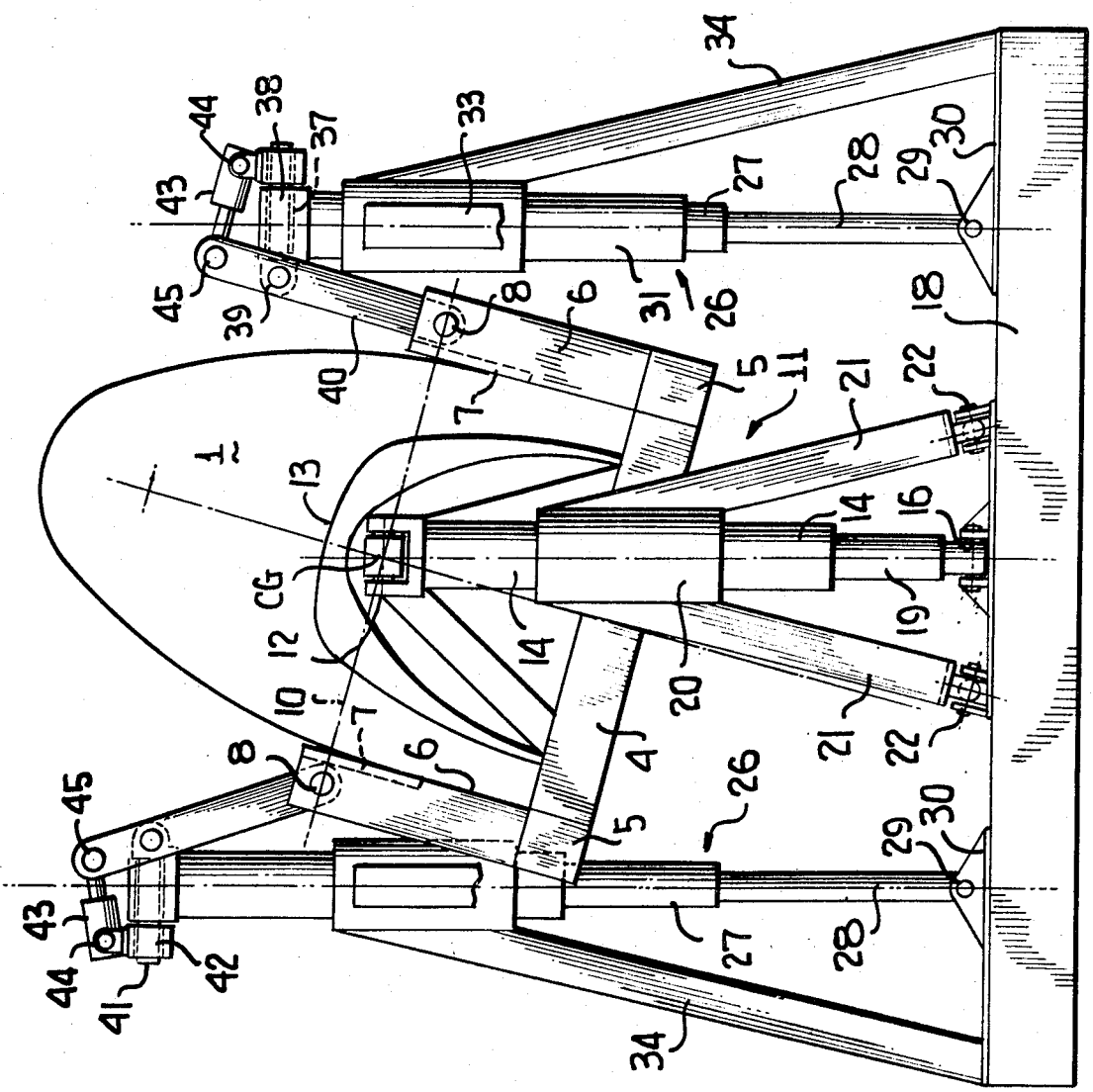
FIG. 2 is a front view of the system showing a deviation from normal roll attitude.

Referring to the drawings, and particularly to FIGS. 1 and 2, a simulated cockpit 1 having a canopy 2 with a hinge area 3 by which the canopy may be raised to permit entry of a student, is fixedly mounted on an interface frame 4. Welded to extension brackets or flanges 5 at either side of frame 4 are pairs of fixed hangers 6, each pair attached by a respective cross brace 7 having a universal joint 8 fastened to its center to permit movement of the cockpit about roll (longitudinal) axis 9 and about pitch (transverse) axis 10. Universal joint 8 is partly hidden by the hanger assembly and by side ram structure, but may be of any conventional form such as that joint or pivot assembly which permits rotation about mutually perpendicular axes at the front ram assembly of the motion system, as will be described presently.

The cockpit and interface frame are normally oriented with the pitch and roll axes in a common plane parallel to a base frame 18, but are movably supported (as a unit) at three points by vertical translating ram assemblies positioned at the nose and either side of the simulated craft. The front ram assembly 11 is pivotally connected to the nose of the craft (but may alternatively be coupled to the opposite end) to permit rotation of the craft about mutually perpendicular axes at or near that point. To that end, the front ram head 12 includes a pivotal joint 13 defining a lateral axis about which the cockpit rotates as the front ram (reciprocable member) 14 is actuated upwardly and downwardly, and just behind that joint is a second pivot 15 disposed along the longitudinal axis (roll axis 9) of the cockpit, the latter axis extending through the center of mass (CG) of the cockpit. A third pivot 16 is coupled to a flange or plate 17 at the base of the front ram, and this flange is fastened to the main frame or base 18 of the flight simulator. Projecting upwardly from pivot member 16 is the hydraulic actuator 19 for the front ram. Actuator 19 may be a conventional hydraulic cylinder which, in accordance with controlled pressure via a hydraulic feed system (not shown) is effective to produce selected upward or downward movement of front ram or piston 14, thereby producing movement of cockpit about the transverse axis through pivot 8 to simulate the pitch of an actual craft.

A bearing housing 20 is provided through which front ram 14 may slide vertically in response to the control exercised by the student or by an instructor on the vertical actuator 19. Housing 20 is fixed at a preselected height by braces or struts 21, which are fixedly attached to the housing and extend downwardly and outwardly therefrom to pivots 22 coupled to plate 17 to support the front ram assembly against lateral sway but to permit some longitudinal movement. Such longitudinal movement is limited by a pair of hydraulic actuators 23 pivotally fastened to plate 17 by respective lower couplings 24 and to respective braces 21 by upper couplings 25. Normally, actuators 23 are utilized as dampers (shock absorbers), but by control of pressure through separate hydraulic feed lines (not shown) may be used to selectively impart short stroke impact loading on the front ram assembly.

Each side ram assembly 26, of which there are two, is of basically the same design as front ram assembly 11, with an actuator 27 connected (here, via an extender 28) to a pivot 29 coupled to a plate 30 which is fastened to base 18. The vertical ram or piston 31 associated with actuator 27 slidably extends through a bearing housing or cylinder 32. Like the front ram bearing housing, each side ram bearing housing 32 is attached to braces or struts, except that, here, one brace 33 extends vertically downward from its line of attachment at the front of the bearing housing and second and third braces 34 and 35 extend downwardly at an angle toward the side and rear, respectively, of the side ram assembly; and each of these three braces is rigidly fastened (e.g., welded) to plate 30.

Fastened to the respective head 36 of each side ram is an upper pivot 37 and pivot bearing 38 arranged to cooperate with the lower pivot 8 and front pivot 13 to permit rotation of the cockpit, upon control of the appropriate mechanisms, about pitch axis 10 (FIG. 2) extending transversely through the approximate center of mass (CG) of the cockpit-interface frame unit. Still another pivot 39, having an axis parallel to the roll axis 9 is connected to the end of bearing 38 closest the cockpit, and is coupled to a point near one end of an arm 40 whose opposite end is pivotally fastened to universal joint 8 of the cockpit hanger assembly. Pivots 39 and 8 cooperate with front pivot 15 to permit rotation of the cockpit about roll axis 9 upon appropriate actuation of the motion system to produce roll in either direction.

An extension 41 of pivot 37 for each side ram assembly has a further bearing 42 pivotally coupled thereto and to an actuator 43 at pivot 44. The opposite end of actuator 43 is coupled to a pivot 45 having an axis parallel to the roll axis and riding in a bearing surface at the upper end of hanger arm 40. Like each of actuators 23 of the front ram assembly, each of actuators 43 of the side ram assemblies normally serves as a motion or vibration damper (i.e., as a shock absorber); here, to prevent undesirable lateral sway or oscillation at the end point of a roll movement. However, actuator 43 may also be employed to produce limited lateral motion of the cockpit by controlled intermittent supply of fluid via suitable feed lines (not shown) to periodically increase and/or reduce the pressure in the respective actuator.

Figure 3:
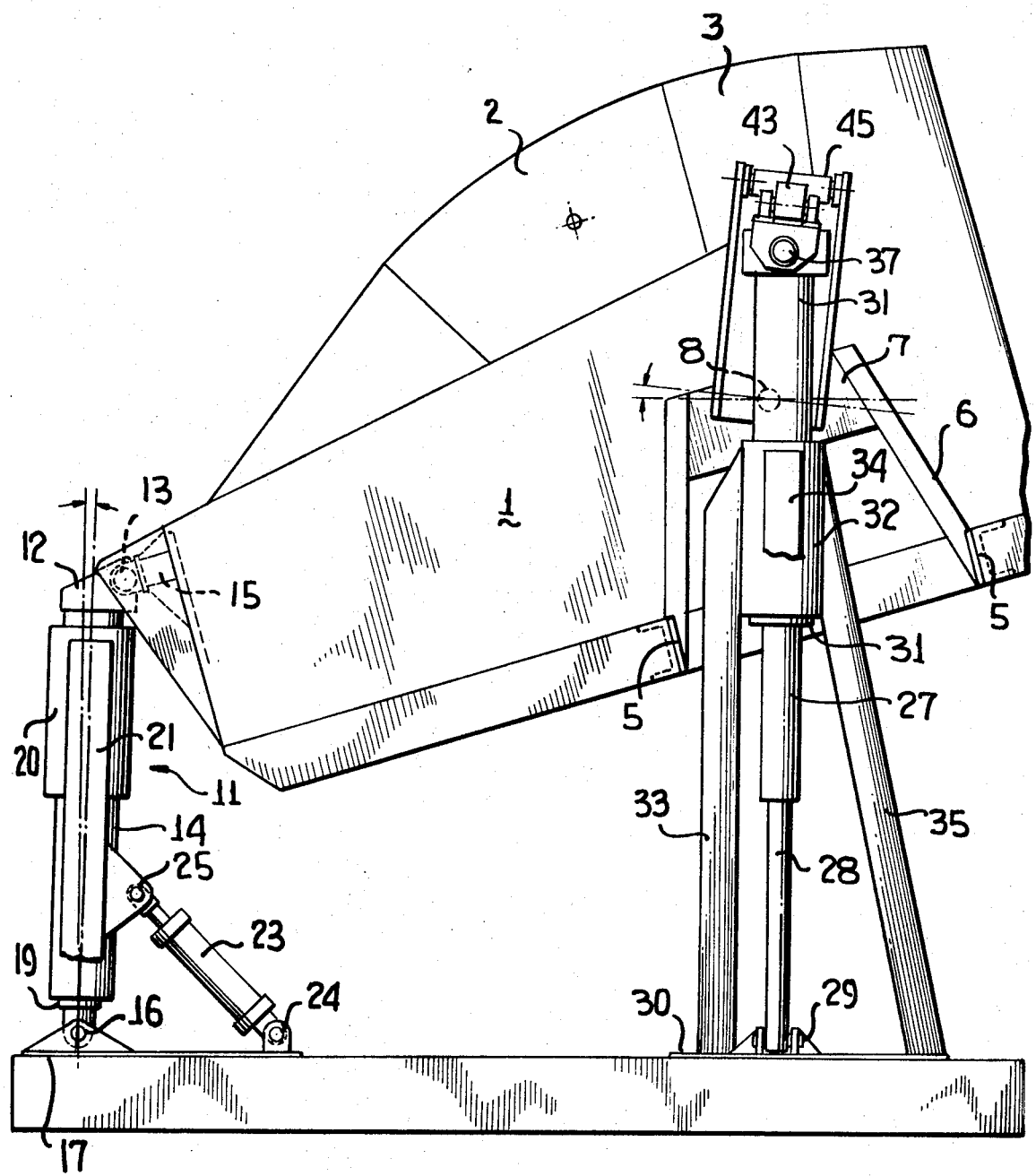
FIG. 3 is a side view similar to FIG. 1, but showing a change of pitch attitude.

In operation of the motion system, pitch of the craft in a counterclockwise direction (as viewed in FIGS. 1 and 3) or in a clockwise direction is accomplished by appropriate operation by the student of simulated controls in the cockpit to reduce or to increase the pressure, respectively, in hydraulic actuator 19, and thereby to lower (see FIG. 3) or to raise front ram 14. Vertical movement of ram 14, of course, initiates rotation of the cockpit about the pitch axis by propelling the fore end of the cockpit in a corresponding direction. As the craft so rotates, it produces a slight deviation of the front ram assembly from the vertical, as indicated in FIG. 3, as a result of the motion of the fore end of the cockpit through a slight arc. This limited deviation is permitted, by the capability of the front ram assembly to pivot about points 16 and 22. However, vibration or instability of the cockpit during the pitch movement is prevented by the presence and operation of actuators 23 as dampers. As front ram 14 moves vertically, or approximately so, the cockpit rotates in the appropriate sense about pitch axis 10, irrespective of the roll attitude of the cockpit at that moment, by virtue of the pivot existing at 13, 8, and 37. Thus, changes of pitch are accomplished with completely realistic simulation as the student "feels" the rotation of the craft about its center of mass in substantially the same manner that a maneuver of the same sort would occur in an actual craft.

To produce roll of the cockpit about axis 9, the pressure in an actuator 27 of one side ram assembly 26 is increased and the pressure in the actuator 27 of the other side ram assembly is reduced to cause rotation of the cockpit in the proper sense on pivot points 15, 8, and 29 with vertical movement of rams 31. Again, this motion is independent of the particular pitch attitude of the cockpit because of the pivotal arrangement for pitch and roll. As previously observed, actuators 43 atop the side ram assemblies are used as dampers to reduce vibration or oscillation from side to side when the roll maneuver is concluded. Alternatively, actuators 43 may be utilized in an active sense to produce limited lateral motion of the cockpit, if desired.

To produce vertical movement of the cockpit, simulating either upward or downward heave, all three rams, the front ram and the two side rams, are actuated simultaneously in the same direction. The firing of weaponry, such as 200 mm. cannon, or rockets, may be simulated by the controlled delivery of a momentary pulse to the cockpit in the longitudinal direction, by appropriate rapid reduction of pressure in actuators 23.

In practice, the vertical ram assemblies, both front and side may correspond to that shown in my U.S. Pat. No. 3,352,029 issued Nov. 14, 1967, particularly with respect to attachment of head to ram (piston) and to the vertical actuator. The ram bearing insert, such as that of front bearing housing 20, may be completely conventional (as are the other components of the overall system) with suitable lubricant retained along the sliding surface by O-rings or other sliding seals. However, this does not preclude the possible use of ball or contoured roller bearing assemblies, or other commercially available bearing combinations.

Preferably, each of the hydraulic actuators is controlled via a servo loop containing amplifiers which receive position-indicating feedback signal from potentiometers located at an appropriate sensor point for the particular control to be exercised, as is conventional in and of itself. Linear potentiometers may be connected to the rams to detect magnitude and direction of translation, whereas rotary pots can be used to detect sense and angle of pitch and roll.

One of the principal safety factors of flight simulators according to the present invention is the capability of the interface frame and the attached cockpit to descend to a low elevation in a completely horizontal orientation upon loss of hydraulic pressure or electrical power, or both. This occurs automatically by virtue of the vertical ram system with its three point support, since loss of either pressure or power is characterized by reduction in pressure in the actuators and resultant sinking of the respective rams to the same height, whereupon the canopy is easily opened and personnel may safely leave the simulated cockpit.

I claim:

1. A pitch and roll producing system for a simulated aircraft trainer having pitch and roll axes, said system comprising
    a cockpit having a center of mass on the intersection of said pitch and roll axes,
    a base frame; and
    means coupling said cockpit to said base frame for selectively imparting rotational motion to said cockpit about said pitch and roll axes separately and simultaneously, said means including
        only three translating fluidic motors having movable ends and ends secured to said base frame,
    means coupling each of said movable ends to said cockpit, one at the forward end of said cockpit and the other two at opposite transverse sides of said cockpit, means so pivotally coupling the movable ends associated with said one actuating means to the forward end of said cockpit as to permit rotation of said forward end about said roll axis and also about an axis parallel to said pitch axis, and means so pivotally coupling the movable ends respectively associated with each of said other motors to opposite sides of said trainer as to permit rotations of said trainer about said pitch axis.

2. The combination according to claim 1 wherein at least a pivot of each of the respective pivotal coupling means to the sides of said trainer has a rotary axis located along said pitch axis.

3. The combination according to claim 2 wherein each of said pivotal coupling means to the respective sides of said trainer further includes an arm connected at one end to said pivot and pivotally coupled at the other end to the respective reciprocable means.

4. The combination according to claim 3 wherein said means coupling said actuating means at the forward end of said trainer to said base frame includes a pivotal coupling at said base frame to permit slight movement of the forward end of said trainer back and forth along said roll axis.

5. The combination according to claim 4 wherein is further included means pivotally coupled to said actuation means at the forward end of said trainer and to said base frame for damping vibration of said trainer along said roll axis.

6. The combination according to claim 5 wherein said vibration damping means comprises a further fluidic actuating means having reciprocable means associated therewith for controllably imparting impulse forces to said trainer along said roll axis.

7. The combination according to claim 5 wherein is further included separate means pivotally coupled at one end to the respective reciprocable means of said other two actuating means and at the other end of said other end of said respective arm for damping oscillation of said trainer about said roll axis.

8. The combination according to claim 1 wherein simultaneous equal translation of all said reciprocable means in the same direction is effective to produce corresponding translation of said trainer in a direction normal to said base frame, to simulate heave of said trainer.

9. A motion-producing system for simulating in a training vehicle the maneuverability of and forces acting on an actual vehicle of the same type, said training vehicle having a longitudinal axis, a transverse axis perpendicular to and intersecting said longitudinal axis on the center of mass of said training vehicle and a further axis normal to the plane containing said longitudinal and transverse axes, said system comprising first, second, and third means each selectively controllable to impart translational movement to a respective active end thereof, means fixedly positioning the end of each of said first, second, and third means opposite said active end to maintain a parallel spaced-apart relationship between said first, second, and third means, with said first means positioned in a plane containing said longitudinal axis of said training vehicle, and said second and third means equally spaced from said longitudinal axis in a plane containing said transverse axis when said training vehicle is in a normal rest position with said further axis parallel to each of said first, second, and third means, respective means pivotally coupled to the active end of each of said first, second, and third means for supporting said training vehicle at one end and either side thereof to permit independent rotation of said training vehicle about said longitudinal and transverse axes, the means pivotally coupled to the active end of each of the second and third means including a respective arm hinged at one end to said respective active end for rotation about mutually perpendicular axes thereat, and coupled at the other end to a universal joint maintained always along said transverse axis.

10. In a trainer, a stationary platform, a movable cab subject to roll and pitch, said cab having a longitudinal pitch axis and a transverse roll axis, both axes passing through the center of mass of said cab, a first linear motor, means coupling one end of said first linear motor to said platform to permit only pivotal movement and the other end to a point of said cab located on said longitudinal axis, a second linear motor, means securing one end of said second linear motor to said platform to permit only pivotal movement and the other end to a point of said cab on said transverse axis and on one side of said longitudinal axis and displaced therefrom, a third linear motor, means securing one end of said third linear motor to said platform to permit only pivotal movement and another end secured to said cab on said transverse axis and on the other side of said longitudinal axis and displaced therefrom, said linear motors being arranged for translating motion of said another ends substantially perpendicularly of said platform, and separate means securing said cab to each of said another ends via universal joints which are sufficiently freely rotatable on two axes as to enable selective translatory motions of said another ends of said motors each independently of the others.

11. The combination according to claim 10, wherein said universal joints includes rotary bearings including in the case of said first motor an axis aligned with said longitudinal axis such that said cab is enabled to pivot on said transverse axis and to rotate about said longitudinal axis.

12. The combination according to claim 10, wherein said universal joints in the case of said second and third motors have axes parallel to said longitudinal axis and located on said transverse axis.

13. In a trainer,
a cab assembly having a center of mass and having a longitudinal and a transverse axis extending through said center of mass,
two laterally displaced universal joints located on said transverse axis,
a further universal joint located on said longitudinal axis,
first motor means for moving said further universal joint generally in a vertical sense,
second and third motor means for moving said laterally displaced universal joints independently of each other in vertical senses, and
means securing the nose of said cab to said further universal joints and the sides of said cab to said two laterally displaced universal joints.

14. The combination according to claim 13, wherein is further provided further motor means for moving said cab assembly in the direction of said longitudinal axis, said last means providing damping against longitudinal resonant movement of said cab assembly.

15. In a trainer,
a base,
a cab,
at least three linearly translating ram motors extending between said support and said cab,
said motors each having two end elements, each of said motors having one of its end elements secured to said base, and
universal joint means coupling the other end element of each of said motors to said cab adjacent to the nose and to opposite sides, respectively, of each cab,
wherein said cab has a center of mass and a longitudinal and transverse axis intersecting at said center of mass at least while said cab is in one of its possible attitudes,
wherein said universal joint means are located respectively on said longitudinal and transverse axes.

16. The combination according to claim 15, wherein is included a further motor means for moving said cab in the sense of said longitudinal axis.

17. The combination according to claim 16, wherein said further motor means is operative to tilt one of said linearly translating ram motors.

18. A trainer, comprising a cab, and means for causing said cab to pitch, roll and heave, said cab having a center of mass and a longitudinal and a transverse axis passing through said center of mass at least while said cab is level, said means including motors each arranged to raise and lower and coupled to said cab along said transverse axis one on each side of said longitudinal axis, said means further including means for causing said cab to pitch about said longitudinal axis, wherein said last mentioned means is a single ram motor coupled to said cab on said longitudinal axis.

19. The combination according to claim 18, wherein said motors are linearly translating fluid motors.

20. The combination according to claim 18, wherein is provided an auxiliary fluid motor for tilting said single ram motor to introduce motion along said longitudinal axis.

21. The combination according to claim 18, wherein said motors are coupled to said cab each via two separated universal joints joined by a hangar linkage, one of said universal joints being coupled to said cab and the other to a point of a motor.

22. The combination according to claim 18, wherein said motors are all coupled to said cab via couplings arranged and adapted to permit free translation of each of said motors independently of the others.

23. The combination according to claim 18, wherein said motors are each coupled to said cab via universal joint means arranged and adapted to permit roll of said cab in response to independent translations to diverse extents of said two motors.

24. In a trainer,
a cab having a nose and having a center of mass and a longitudinal axis passing through said nose and a transverse axis, both axes passing through said center of mass,
a linear motor translatable only substantially vertically,
universal joint means coupling said nose to said motor at a point of said longitudinal axis, and
means pivoting said cab at two points of said transverse axis located on opposite sides of said longitudinal axis.

25. The combination according to claim 24, wherein is further included two motor means each secured to one of said means pivoting said cab for rolling said cab about said longitudinal axis.

26. The combination according to claim 25, wherein all said motors are linearly translating fluid rams.

27 The combination according to claim 24 wherein said linear motor is a linearly translatory fluid ram.

28. The combination according to claim 24, wherein is further provided motor means for tilting said linear motor in the direction of said longitudinal axis.

29. In a trainer, a fixed base, a cab having a center of mass and having a longitudinal axis and a transverse axis, both said axes passing substantially through said center of mass, three linear motors each secured at one end to said fixed base and coupled at the other end to a point of said cab, means securing two of said motors rigidly to said fixed base and extending orthogonally with respect to said fixed base, means securing another of said motors at said one end pivotally to said fixed base such as to enable tilting along said longitudinal axis, the points of said cab consisting of two points on said transverse axis and the remaining point on said longitudinal axis.

30. The combination according to claim 29, wherein is provided universal joint means coupling said three points of said cab to said other ends of said motors, respectively.

31. In a system for simulating an aircraft, a cab having a center of mass, and having roll and pitch axes passing through said center of mass, first motor means for effecting pitch and roll of said cab about said center of mass and also heave of said cab, and further motor means for moving said cab in the directions of said axes and for damping oscillatory motions in the directions of said axes, said further motor means including couplings to said cab located on said axes, wherein said first motor means consists of three rams.

* * * * *